Feb. 11, 1930.  M. WOOLLEY  1,746,979
SLICING MACHINE FOR VEGETABLES AND FOODSTUFFS
Filed Feb. 13, 1929
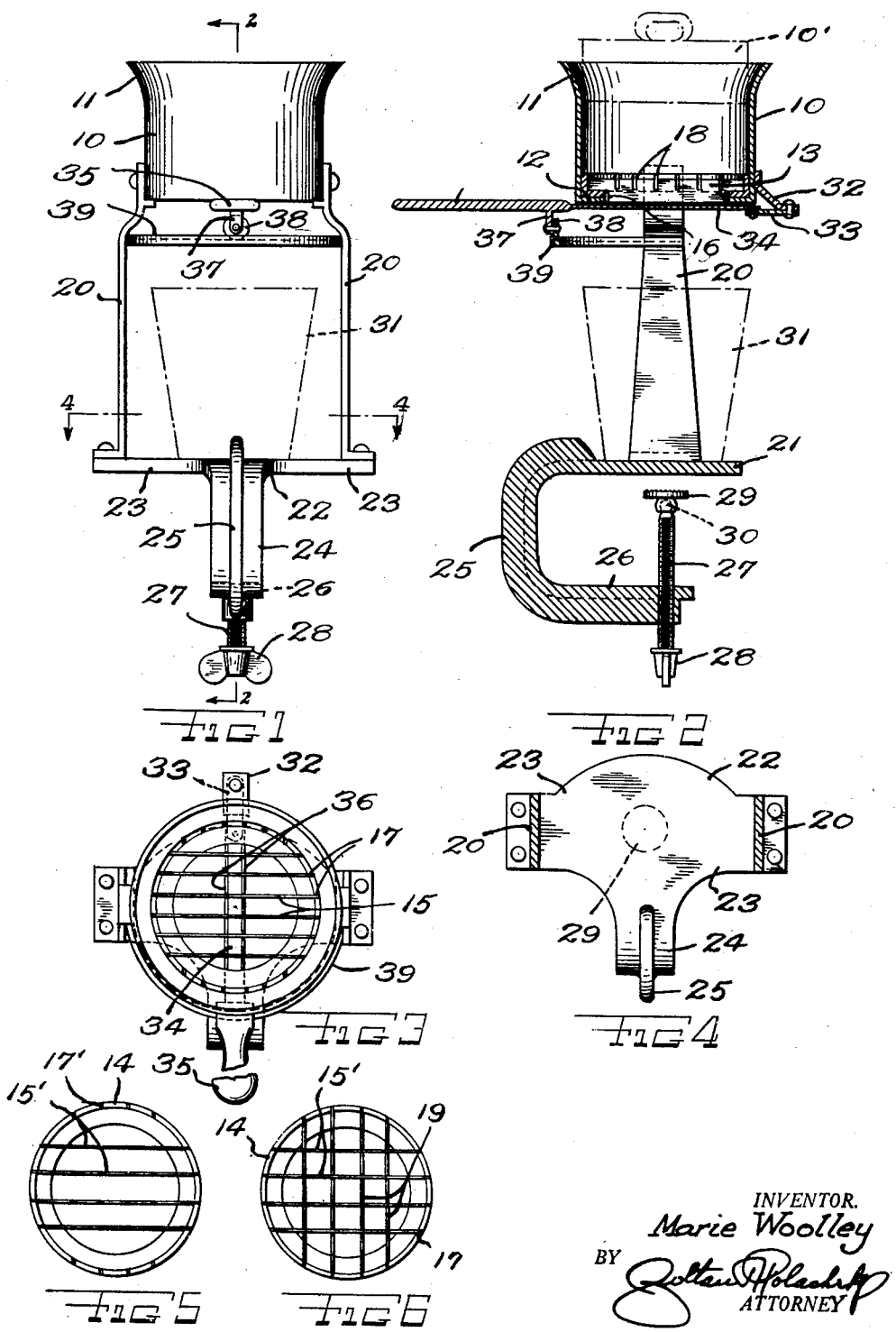
INVENTOR.
Marie Woolley
BY
ATTORNEY Patented Feb. 11, 1930

1,746,979

UNITED STATES PATENT OFFICE

MARIE WOOLLEY, OF BROOKLYN, NEW YORK

SLICING MACHINE FOR VEGETABLES AND FOODSTUFFS

Application filed February 13, 1929. Serial No. 339,530.

This invention relates generally to vegetable slicers and has more particular reference to a novel device for slicing vegetables, fruits and the like and for dicing the same.

The invention has for an object the provision of a device of the class mentioned which is of simple durable construction, desirable in use and efficient in action, and which can be manufactured and sold at a reasonable cost.

The invention proposes the use of a cup with an inturned bottom flange upon which a knife grate rests, legs being provided for supporting the cup upon a receptacle support bracket arranged for clamping upon the edge of a table, and a knife is arranged for moving transversely across the bottom of the knife grate.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a front elevational view of a device constructed according to this invention.

Fig. 2 is a central vertical sectional view taken on the line 2—2 of Fig. 1.

Fig. 3 is a plan view of Fig. 1.

Fig. 4 is a horizontal sectional view taken on the line 4—4 of Fig. 1.

Figs. 5 and 6 are plan views of knife grates constructed according to modified forms.

The reference numeral 10 indicates generally a cup having a flared top 11 and an inturned bottom flange 12. A knife grate 13 is disposed within the cup and rests upon the said bottom flange 12. The knife grate has a circular frame 14, L shaped in vertical transverse cross section and a plurality of knives 15 with end cut-outs 16 rest within the frame and upon the bottom arm of said L shape. The frame is provided with a plurality of grooves 17 as seen in Fig. 3 for holding the knives against displacement. The knives are parallel and each of the knives is formed with cut-out portions 18 communicating with the top edges for receiving transverse knives having similar cut-outs communicating with their bottom edge, such transverse knives being shown in Fig. 6 and indicated by numeral 19.

A pair of opposite legs 20 are attached at their top ends upon opposite sides of the cup 10 and at their bottom ends upon a receptacle bracket 21. The receptacle bracket has a top plate member 22 formed with opposite arms 23 and a vertical arm 24 with a reinforcement bulge 25, connects with the top plate 22 and with a horizontal arm 26.

A clamping screw 27 threadedly engages thru the arm 26 and is arranged for clamping the device upon an edge of a table. The clamp screw 27 has a head 28 at its bottom end and at its top end a clamping plate 29 connected with the screw by a universal joint 30.

A receptacle 31 rests upon the top plate 22 directly beneath the knife grate. A support brace 32 is attached upon the cup 10 and pivotally supports a link 33 to which a knife 34 is pivotally connected. The knife has opposite cutting edges 36 and a handle 35. A lug 37 extends from the handle 35 and supports a roller 38 engaged in a roller track 39 supported between the legs 20. This roller track is of semi-elliptical shape to cause the knife to move slightly forwards and rearwards while said knife is moved transversely across the bottom of the knife grate and on the said track.

The modified form of grate illustrated in Fig. 5 shows the knives 15′ thereof spaced closer than the knives of the grate illustrated in Fig. 3. In Fig. 6 transverse knives 19 are also shown, and they cross the knives 15′. The circular frame 14 of the knife grate is provided with grooves 17′ for holding the transverse blades 19 in stationary positions.

A pressing plug 10′ is provided, which may be of any suitable shape, for pressing the food stuff toward the knives.

In operation of the device, vegetables and fruits are inserted within the cup 10 and manually forced downwards to partially extend beneath the knife grate. Obviously certain cuts are formed within the vegetables and fruits while they are forced thru the grate. Then the knife 34 may be moved transversely for cutting off the portions of the vegetables and fruits extending beneath the grate. Additional pressure upon the contents in the cup forces more thru the grate and again the knife may be moved for cutting the additional projecting portions.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A device for slicing vegetables, fruits and the like, comprising a cup, a knife grate supported in the bottom thereof, means for supporting the cup, and a knife arranged to move transversely across the bottom of the grate, pivotally supported on a link in turn pivotally supported on the cup, said knife having a handle with a depending lug supporting a roller guided in a roller track attached on legs connected with the cup.

2. A device for slicing vegetables, fruits and the like, comprising a cup, a knife grate supported in the bottom thereof, means for supporting the cup, and a knife arranged to move transversely across the bottom of the grate, pivotally supported on a link in turn pivotally supported on the cup, said knife having a handle with a depending lug supporting a roller guided in a roller track attached on legs connected with the cup, said legs being supported on a receptacle support bracket.

3. A device for slicing vegetables, fruits and the like, comprising a cup, a knife grate supported in the bottom thereof, means for supporting the cup, and a knife arranged to move transversely across the bottom of the grate, pivotally supported on a link in turn pivotally supported on the cup, said knife having a handle with a depending lug supporting a roller guided in a roller track attached on legs connected with the cup, said legs being supported on a receptacle support bracket, arranged for clamping upon a table.

In testimony whereof I have affixed my signature.

MARIE WOOLLEY.